United States Patent
Kwon et al.

(10) Patent No.: US 9,338,807 B2
(45) Date of Patent: May 10, 2016

(54) SYSTEM AND METHOD FOR DIRECT MOBILE COMMUNICATIONS POWER CONTROL

(75) Inventors: Young Hoon Kwon, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 755 days.

(21) Appl. No.: 13/424,078

(22) Filed: Mar. 19, 2012

(65) Prior Publication Data

US 2013/0244715 A1 Sep. 19, 2013

(51) Int. Cl.
  *H04W 52/04* (2009.01)
  *H04W 88/06* (2009.01)
  *H04W 24/02* (2009.01)
  *H04W 76/02* (2009.01)
  *H04W 52/24* (2009.01)
  *H04W 52/38* (2009.01)
  H04W 52/36 (2009.01)

(52) U.S. Cl.
  CPC .......... *H04W 76/023* (2013.01); *H04W 52/242* (2013.01); *H04W 52/383* (2013.01); *H04W 52/244* (2013.01); *H04W 52/367* (2013.01)

(58) Field of Classification Search
  CPC ............ H04W 52/242; H04W 52/383; H04W 52/244; H04W 52/245; H04W 52/367; H04W 72/02; H04W 76/023
  See application file for complete search history.

(56) References Cited

U.S. PATENT DOCUMENTS

| | | |
|---|---|---|
| 2008/0166976 A1 | 7/2008 | Rao |
| 2010/0261469 A1 | 10/2010 | Ribeiro et al. |
| 2011/0170431 A1 | 7/2011 | Palanki et al. |
| 2011/0306349 A1 | 12/2011 | Hakola et al. |
| 2012/0028672 A1 | 2/2012 | Chen et al. |
| 2012/0051315 A1* | 3/2012 | Wang et al. .................. 370/329 |
| 2012/0129562 A1* | 5/2012 | Stamoulis et al. ............ 455/517 |
| 2013/0230032 A1* | 9/2013 | Lu et al. ........................ 370/336 |
| 2013/0295983 A1* | 11/2013 | Kim et al. ..................... 455/522 |

FOREIGN PATENT DOCUMENTS

| | | |
|---|---|---|
| CN | 102348272 A | 2/2012 |
| CN | 102404837 A | 4/2012 |
| WO | 2011138495 A1 | 11/2011 |

OTHER PUBLICATIONS

Dongcheol Kim et al. "Power Control for Direct Communication", U.S. Appl. No. 61/431,052, filed Jan. 10, 2011, 10 pages.*

(Continued)

*Primary Examiner* — Fanghwa Wang
(74) *Attorney, Agent, or Firm* — Slater Matsil, LLP

(57) ABSTRACT

A method for transmitting to a direct mobile communications (DMC) device by a user equipment operating in both a cellular mode and a DMC mode includes estimating a first pathloss of a first channel from the user equipment to a base station according to a difference between a known base station transmit power level and a received base station power level, and estimating a second pathloss of a second channel from the user equipment to the DMC device according to a difference between a known DMC device transmit power level and a received DMC device power level. The method also includes setting a transmit power level for transmission to the DMC device according to the first pathloss and the second pathloss, and transmitting a signal to the DMC device at the transmit power level.

18 Claims, 8 Drawing Sheets

(56) References Cited

OTHER PUBLICATIONS

International Search Report and Written Opinion of Patent Cooperation Treaty (PCT), International Application No. PCT/CN2013/072669, Applicant Huawei Technologies Co., Ltd., date of mailing Jun. 27, 2013, 15 pages.

Jaenis, P., et al., "Interference-aware resource allocation for device-to-device radio underlaying cellular networks," IEEE, 2009, 5 pages.

"3$^{rd}$ Generation Partnership Project; Technical Specification Group Radio Access Network; Evolved Universal Terrestrial Radio Access (E-UTRA); FDD Home eNode B (HeNB) Radio Frequency (RF) requirements analysis (Release 10)," 3GPP TR 36-921, V10.0.0, Apr. 2011, 45 pages.

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.4.0, Dec. 2011, 125 pages.

Peng, T., et al., "Interference avoidance mechanisms in the hybrid cellular and device-to-device systems," IEEE 20th International Symposium on Personal, Indoor and Mobile Radio Communications, Sep. 13-16, 2009, pp. 617-621.

Supplementary European Search Report received in European Application No. 13763824.3, dated Dec. 15, 2014, 6 pages.

Extended European Search Report dated Mar. 12, 2015, Application No. 13763824.3, 13 pages.

\* cited by examiner

SYSTEM AND METHOD FOR DIRECT MOBILE COMMUNICATIONS POWER CONTROL

TECHNICAL FIELD

The present invention relates generally to digital communications, and more particularly to a system and method for direct mobile communications (DMC) power control.

BACKGROUND

In the field of wireless communication, there has been increasing demand for direct device-to-device communication (D2D), direct mobile communication (DMC), and the like. This form of communications refers to a communications mode between two or more user equipment (UE) that does not include or does not always include a communications controller in a communication path between or among the UEs. DMC will be used herein to denote this form of communication. Generally, DMC communications involve direct communications between multiple DMC devices (the DMC devices are also commonly referred to as User Equipments (UE), mobile stations, mobiles, communications devices, subscribers, terminals, and the like) occurring as point-to-point (PTP) communications without having the communications passing through and being fully controlled by a communications controller, such as an evolved NodeB (eNB), a NodeB, a base station, a controller, a communications controller, and the like.

FIG. 1a illustrates a prior art communications system 100, wherein UE, such as UE 110 and UE 115, are communicating with an eNB 105. Communications that are controlled by a communications controller, such as eNB 105, may be generally referred to as cellular communications. It is noted that while only two UEs are represented in FIG. 1a, in practice, there may be more than two UEs communicating with each other. As an example, multiple UEs would be communicating with each other if a multicast group is set up.

FIG. 1b illustrates a prior art communications system 150, wherein UE 160 and UE 165 are communicating using DMC communications. As shown in FIG. 1b, communications system 150 includes an eNB 155, but with UE 160 and UE 165 using DMC communications, their communications are directly exchanged without interaction with eNB 155.

SUMMARY OF THE INVENTION

Example embodiments of the present invention which provide a system and method for DMC power control.

In accordance with an example embodiment of the present invention, a method for transmitting to a direct mobile communications (DMC) device by a user equipment operating in both a cellular mode and a DMC mode is provided. The method includes estimating a first pathloss of a first channel from the user equipment to a base station according to a difference between a known base station transmit power level and a received base station power level, and estimating a second pathloss of a second channel from the user equipment to the DMC device according to a difference between a known DMC device transmit power level and a received DMC device power level. The method also includes setting a transmit power level for transmission to the DMC device according to the first pathloss and the second pathloss, and transmitting a signal to the DMC device at the transmit power level.

In accordance with another example embodiment of the present invention, a method for operating a direct mobile communications (DMC) device is provided. The method includes receiving an instruction to transmit a channel measurement signal to a transmitting DMC device at a specified network resource, and transmitting the channel measurement signal to the transmitting DMC device at the specified network resource.

In accordance with another example embodiment of the present invention, a user equipment is provided. The user equipment includes a processor, and a transmitter operatively coupled to the processor. The processor estimates a first pathloss of a first channel from the user equipment to a base station according to a difference between a known base station transmit power level and a received base station power level, estimates a second pathloss of a second channel from the user equipment to a direct mobile communications (DMC) device according to a difference between a known DMC device transmit power level and a received DMC device power level, and sets a transmit power level for transmission to the DMC device according to the first pathloss and the second pathloss. The transmitter transmits a signal to the DMC device at the transmit power level.

One advantage of an embodiment is that additional estimations and/or measurements of pathloss in a cellular network for use in DMC power control are not needed. Thereby, simplifying the implementation of the example embodiments.

A further advantage of an embodiment is that the interference to the eNB from the DMC link (or DMC channel) is set by the eNB.

Yet another advantage of an embodiment is that although open loop power control is utilized, the eNB has full control of the DMC UE's transmit power level by its setting of interference level parameters.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to DMC power control. For example, a UE sets its transmit power level for DMC transmissions by considering a pathloss to an eNB that serves the UE while the UE is operating in a cellular mode and a pathloss to a DMC device to which the UE is transmitting.

The present invention will be described with respect to example embodiments in a specific context, namely a Third Generation Partnership Project (3GPP) Long Term Evolution (LTE) technical standards compliant communications system that supports both cellular communications and DMC communications. The invention may also be applied, however, to other technical standards compliant communications systems, such as IEEE 802.16m, WiMAX, and the like, technical standards that support both cellular communications and DMC communications, as well as non-technical standards compliant communications systems.

Figure 1A:
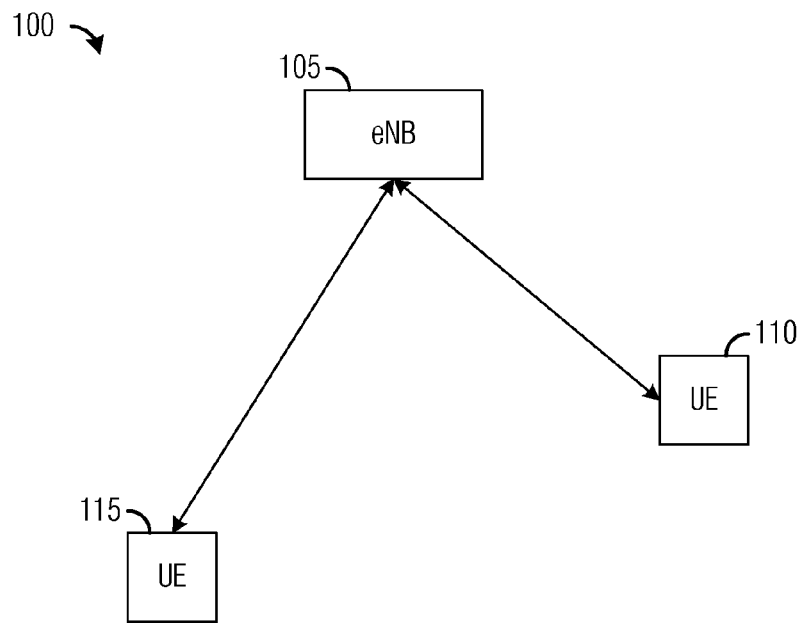
FIG. 1a illustrates a prior art communications system, wherein UEs are communicating with an eNB.
Figure 1B:
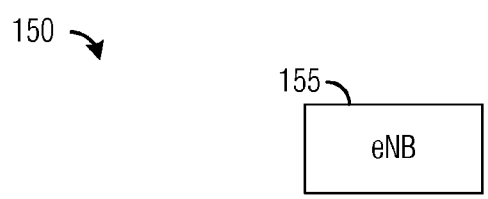
FIG. 1b illustrates a prior art communications system, wherein UEs are communicating using DMC communications.
Figure 1B:
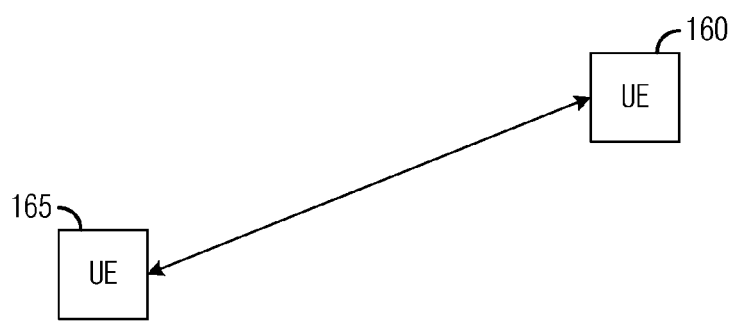
Figure 2:
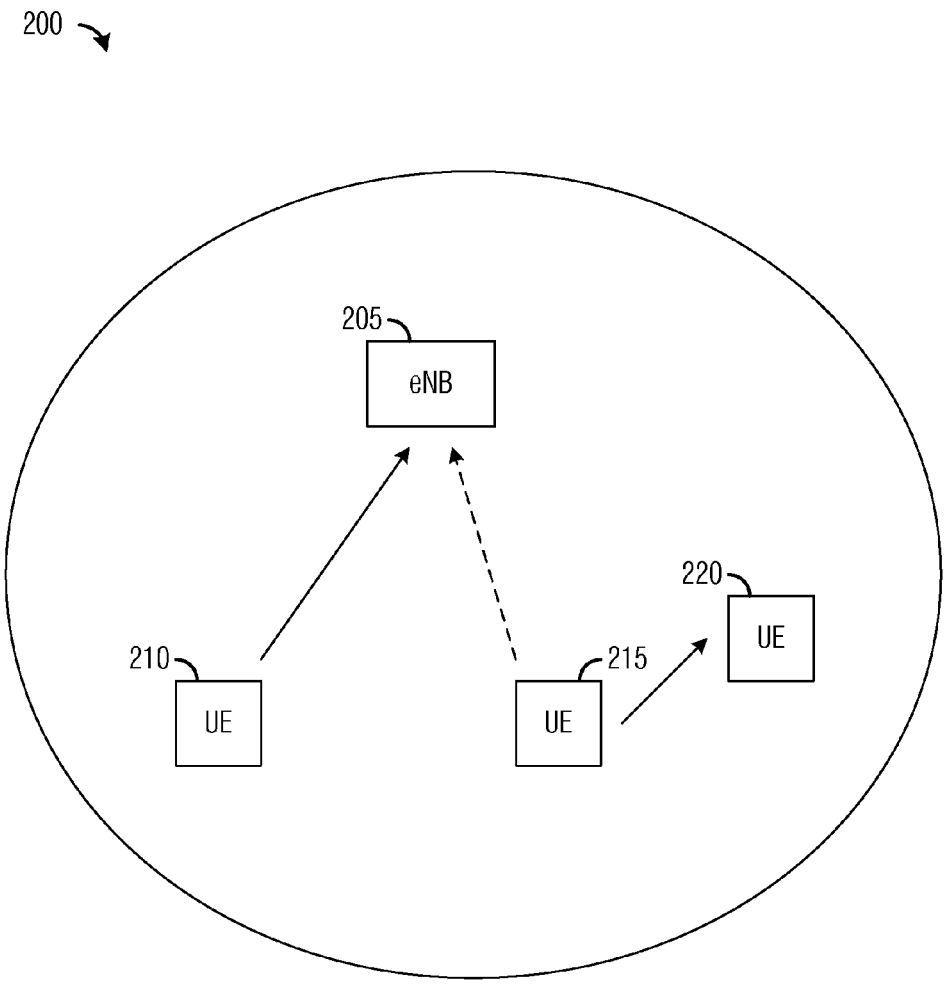
FIG. 2 illustrates an example communications system where the communications system is a cellular network that supports a DMC mode according to example embodiments described herein.

FIG. 2 illustrates a communications system 200 where communications system 200 is a cellular network that supports a DMC mode. Communications system 200 includes an eNB 205 that provides support for cellular communications as well as DMC communications. Communications system 200 also includes a plurality of UEs, such as UE 210, UE 215, and UE 220. As shown in FIG. 2, UE 210 is being served by eNB 205. As such, UE 210 is operating in a cellular mode. While, UE 215 is directly transmitting to UE 220 over a DMC link (or similarly, a DMC channel) without interaction with eNB 205. Hence, UE 215 and UE 220 are operating in a DMC mode.

Although UE 210 and UEs 215 and 220 are operating in different modes, they may be utilizing uplink cellular resources controlled by eNB 205. As such, a transmission by UE 215 to UE 220 over the DMC link (or DMC channel) may overlap, at least in part, with a transmission by UE 210 to eNB 205 (i.e., an uplink transmission) and cause interference to the transmission.

It is noted that the discussion presented herein focuses on DMC transmissions occurring in uplink network resources. However, DMC transmissions may also occur in downlink network resources. Therefore, the discussion of the use of uplink network resources should not be construed as being limiting to either the scope or the spirit of the example embodiments.

While it is understood that communications systems may employ multiple eNBs capable of communicating with a number of UEs, only one eNB and three UEs are illustrated for simplicity.

Figure 3:
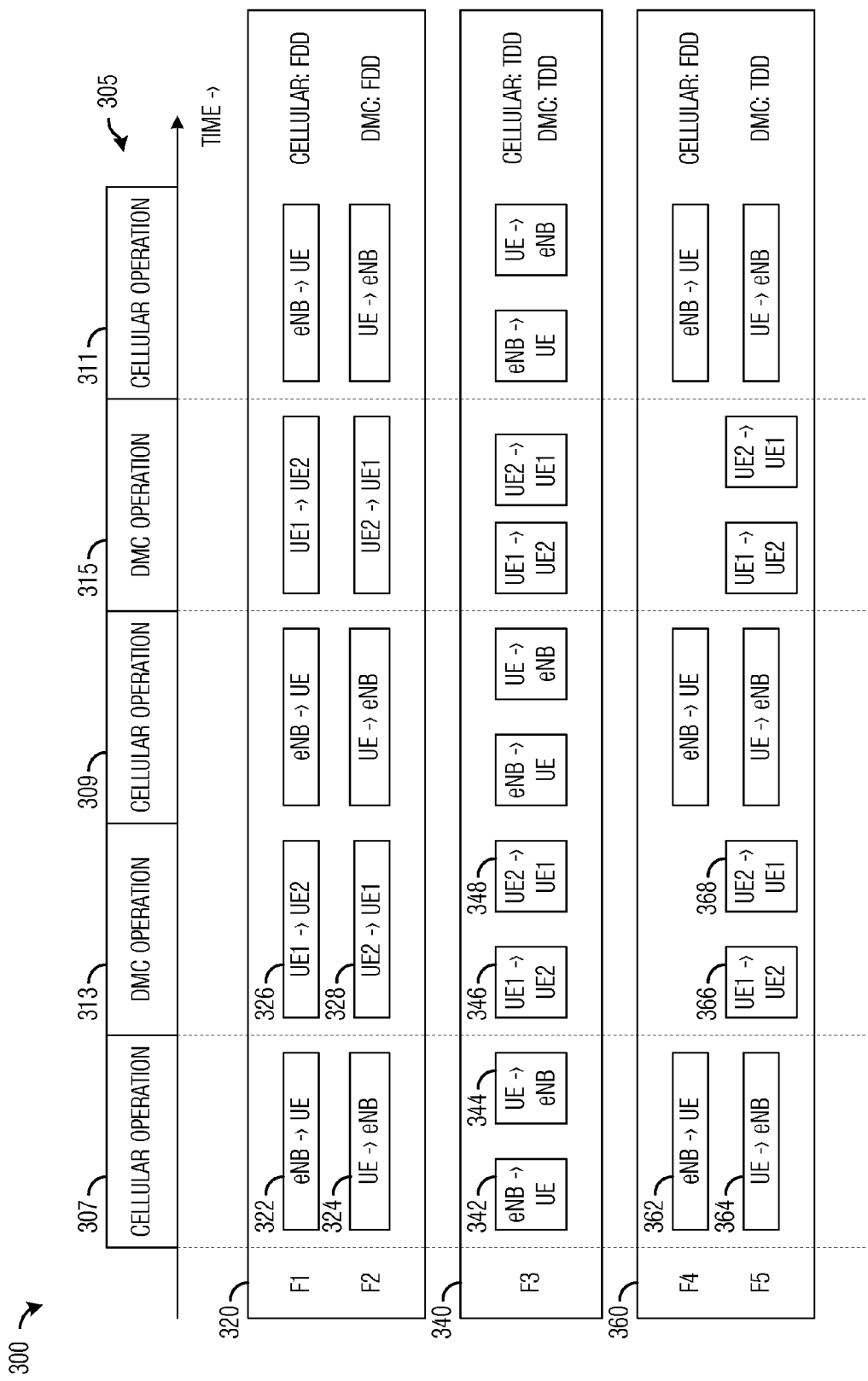
FIG. 3 illustrates an example diagram of DMC operation in a communications system according to example embodiments described herein.

FIG. 3 illustrates a diagram 300 of DMC operation in a communications system. In a communications system that is a cellular network with support for a DMC operating mode, the DMC UEs may switch between a cellular operating mode and DMC operating mode in a time division duplex manner. UEs that operate solely in the cellular operating mode may communicate in the cellular operating mode the entire time.

A time line 305 illustrates time intervals when a DMC UE is operating in the cellular operating mode (e.g., interval 307, interval 309, and interval 311) and in the DMC operating mode (e.g., interval 313, and interval 315). In general, when operating in a particular operating mode, the DMC UE may utilize frequency division duplex (FDD) or time division duplex (TDD) to access available network resources.

As an example, highlight 320 illustrates a scenario wherein DMC UEs are using FDD in both the cellular operating mode and the DMC operating mode. With FDD, transmissions in different directions occur in different frequency bands. As shown in highlight 320, in the cellular operating mode, downlink (from an eNB to a UE) transmissions 322 occur in frequency band F1, while uplink (from a UE to an eNB) transmissions 324 occur in frequency band F2. Similarly, in the DMC operating mode, transmissions 326 from a first UE to a second UE occur in frequency band F1, while transmissions 328 from the second UE to the first UE occur in frequency band F2.

As another example, highlight 340 illustrates a scenario where DMC UEs are using TDD in both the cellular operating mode and the DMC operating mode. With TDD, transmissions in different directions occur in different time intervals. As shown in highlight 340, in the cellular operating mode, downlink transmissions occur in a first time interval 342, while uplink transmissions occur in a second time interval 344. Similarly, in the DMC operating mode, transmissions from a first UE to a second UE occur in a third time interval 346, while transmissions from the second UE to the first UE occur in a fourth time interval 348.

As another example, highlight 360 illustrates a scenario where DMC UEs are using FDD in the cellular operating mode and TDD in the DMC operating mode. As shown in highlight 360, in the cellular operating mode, downlink transmissions 362 occur in a first frequency band F4, while uplink transmissions 364 occur in a second frequency band F5. While, in the DMC operating mode, transmissions from a first UE to a second UE occur in a first time interval 366 of the frequency band used for uplink transmissions, while transmissions from the second UE to the first UE occur in a second time interval 368 of the frequency band used for uplink transmissions.

Figure 4:
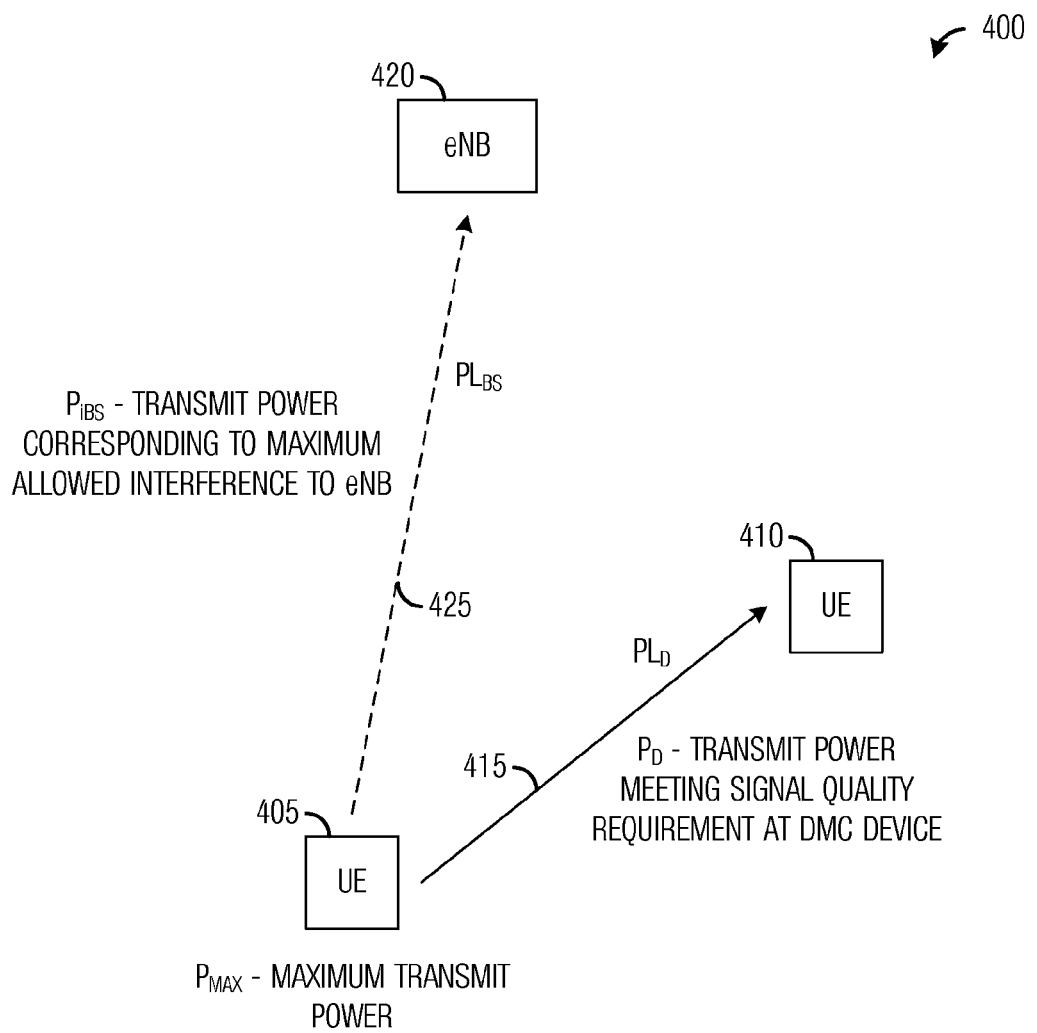
FIG. 4 illustrates an example communications system highlighting an interference scenario for a DMC transmission utilizing uplink resources of a cellular network according to example embodiments described herein.

FIG. 4 illustrates a communications system 400 highlighting an interference scenario for a DMC transmission utilizing uplink resources of a cellular network. Communications system 400 includes a UE 405 directly communicating with UE 410 over a DMC channel 415, which is allocated by eNB 420 from its uplink resources. Since DMC channel 415 is allocated from uplink resources of eNB 420, if eNB 420 is also receiving uplink transmissions from other UEs that it is serving, it may be possible that a transmission over DMC channel 415 is also received by eNB 420 as interference (the interference caused by the transmission over DMC channel 415 is shown in FIG. 4 as interference channel 425).

Pathloss may be defined as a reduction or attenuation of a signal as it propagates through space. Generally, a recipient of a transmission may have a requirement that the transmission arrive at the recipient at a minimum power level ($P_{DMIN}$) to ensure that the recipient be able to properly detect and decode the transmission. A transmit power level corresponding to the minimum power level to ensure proper detection and decoding at UE 410 is denoted as $P_D$ and the pathloss for DMC channel 415 is denoted as $PL_D$. Therefore, the transmission may need to be transmitted by UE 405 at a transmit power level (denoted $P_D$) that is greater than or equal to $P_{DMIN}+PL_D$, which may ensure that the transmission as received by UE 410 is at a power level of $P_{DMIN}$ or greater.

Since the transmission over DMC channel 415 may cause interference to eNB 420, eNB 420 may have a restriction in place to ensure that it does not receive the transmission from UE 405 at a power level greater than a maximum allowable interference level, denoted $P_i$. If the path loss of interference channel 425 is denoted $PL_{BS}$, then UE 405 can ensure that it will meet the restriction of eNB 420 by transmitting at a transmit power level (denoted $P_{iBS}$) less than or equal to $P_i+PL_{BS}$.

Another restriction that UE 405 may need to consider in setting the transmit power level for a transmission using DMC channel 415 is its own maximum transmit power level, $P_{MAX}$. Generally, UE 405 may have a maximum transmit power level that it cannot exceed, due to physical limitations of its transmitter hardware, for example, even if other restricts allow for greater transmit power levels.

According to an example embodiment, a UE operating in the DMC operating mode, such as UE 405, and directly transmitting to another UE, such as UE 410, over a DMC channel, such as DMC channel 415, may consider the pathloss of the DMC channel ($PL_D$) and the path loss of the interference channel ($PL_{BS}$) when setting its transmit power level. It is noted that although restrictions, such as the minimum power level to ensure proper detection and decoding and the maximum allowable interference level, also play a role in the UE setting its transmit power level, these restrictions are typically fixed or change very slowly and usually do not require measurements or estimates by the UE. Instead, these restrictions are normally provided to the UE in configuration messages when the UE joins the communications system, powers on, and the like.

Figure 5:
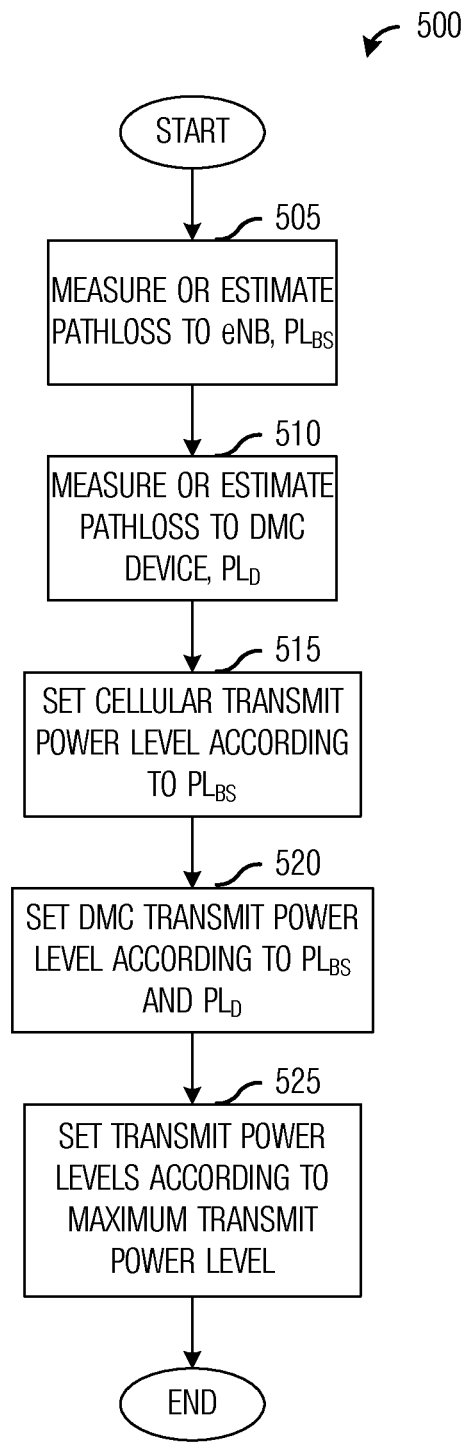
FIG. 5 illustrates an example flow diagram of operations occurring in a UE as the UE sets it's transmit power level for transmissions according to example embodiments described herein.

FIG. 5 illustrates a flow diagram of operations 500 occurring in a UE as the UE sets it's transmit power level for transmissions. Operations 500 may be indicative of operations occurring in a UE, such as UE 215 and UE 405, as the UE performs power control.

Operations 500 may begin with the UE measuring or estimating a pathloss for a channel between itself and an eNB that serves the UE while the UE is operating in a cellular mode (block 505). The pathloss for the channel between the UE and the eNB may be denoted $PL_{BS}$. According to an example embodiment, the UE may measure or estimate $PL_{BS}$ by measuring downlink received signal strength, according to a reference signal or a pilot, for example, of a transmission made by the eNB. The UE may make use of transmit power information provided the eNB to measure or estimate $PL_{BS}$. As an example, the UE may determine $PL_{BS}$ as follows $$PL_{BS}=P_{TRANSMIT}-P_{RECEIVE},$$

where $P_{TRANSMIT}$ is the transmit power level of the downlink transmission measured by the UE and $P_{RECEIVE}$ is the measured received signal strength. The eNB may have provided the UE with $P_{TRANSMIT}$ in a higher layer message, such as by using radio resource control signaling.

According to an example embodiment, the UE may measure $PL_{BS}$ at anytime while it is operating. According to another example embodiment, the UE may measure $PL_{BS}$ while the UE is operating in the cellular mode. By limiting the measurement of $PL_{BS}$ to only while the UE is operating in the cellular mode, the UE is measuring the $PL_{BS}$ while a corresponding DMC UE is not transmitting, for example, its reference signal, which may negatively impact the accuracy of the UE's measurement of $PL_{BS}$.

The UE may measure or estimate a pathloss for a DMC channel between itself and a DMC UE that it is to transmit to (block 510). In a point-to-multipoint configuration, the UE may measure the pathloss for the multiple channels between itself and the multiple DMC UEs that it is transmitting to and select a maximum pathloss, an average pathloss, a weighted average pathloss, and the like, as the pathloss for the channel. The pathloss for the channel between the UE and the DMC UE may be denoted $PL_D$. According to an example embodiment, the UE may measure or estimate $PL_D$ by measuring downlink received signal strength, according to a reference signal or a pilot, for example, of a transmission made by the DMC UE. The UE may make use of transmit power information provided the DMC UE to measure or estimate $PL_D$. As an example, the UE may determine $PL_D$ as follows $$PL_D=P_{DTRANSMIT}-P_{DRECEIVE},$$

where $P_{DTRANSMIT}$ is the transmit power level of the downlink transmission measured by the UE and $P_{DRECEIVE}$ is the measured received signal strength. The DMC UE may have provided the UE with $P_{DTRANSMIT}$ in a higher layer message, such as by using radio resource control signaling.

The UE may set it's transmit power level for transmissions occurring while it is operating in the cellular operating mode according to $PL_{BS}$ (block 515). The UE may set it's transmit power level for transmissions occurring while it is operating in the DMC operating mode according to $PL_{BS}$ and $PL_D$ (block 520). However, the transmit power levels set by the UE may also need to meet its own maximum transmit power level limitation (block 525).

Figure 6:
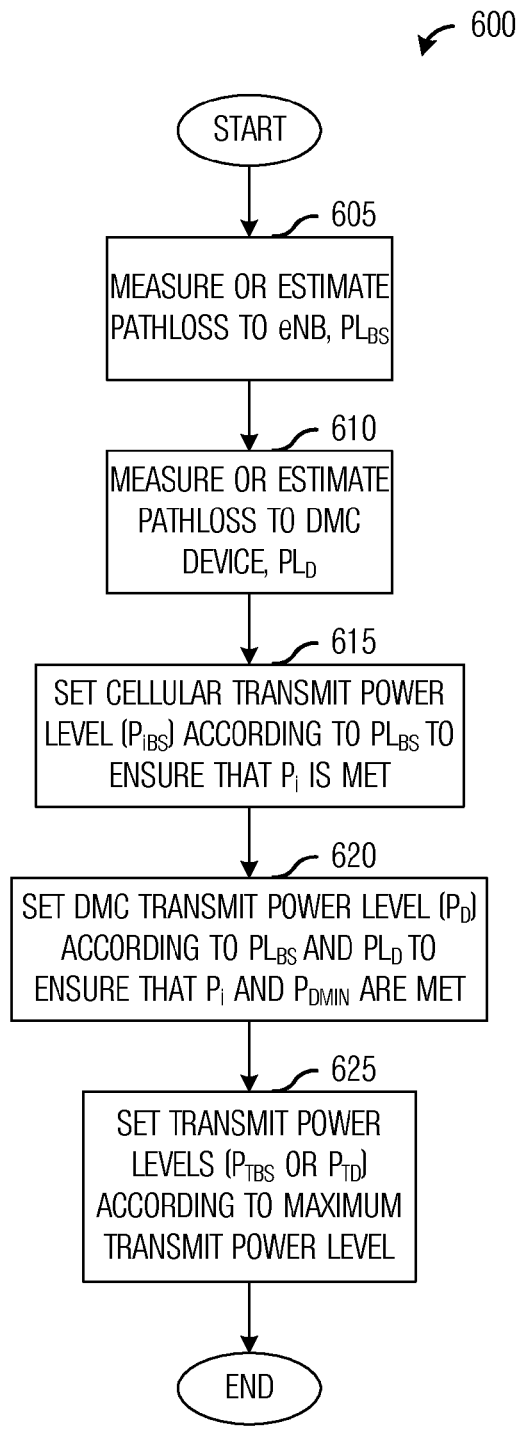
FIG. 6 illustrates an example flow diagram of operations occurring in a UE as the UE sets it's transmit power level for transmissions according to power level restrictions according to example embodiments described herein.

FIG. 6 illustrates a flow diagram of operations 600 occurring in a UE as the UE sets it's transmit power level for transmissions according to power level restrictions. Operations 600 may be indicative of operations occurring in a UE, such as UE 215 and UE 405, as the UE performs power control according to power level restrictions at an eNB and a DMC UE. Operations 600 may be an example embodiment of operations 500 discussed previously.

Operations 600 may begin with the UE measuring or estimating a pathloss for a channel between itself and an eNB that serves the UE while the UE is operating in a cellular mode (block 605). With DMC transmissions, the UE may need to consider the impact of its transmission on the DMC UE in addition to the eNB that is serving the UE when it is operating in the cellular operating mode. The UE may measure or estimate a pathloss for a DMC channel between itself and a DMC UE that it is to transmit to (block 610).

In addition to measuring or estimating the pathloss for the channel between the UE and the eNB, the UE may also receive an indication of a maximum interference level allowed by the eNB, denoted $P_i$. The UE may receive the indication directly from the eNB or through the DMC UE. From the indication, the UE may determine a maximum transmit power level, denoted $P_{iBS}$, that would result in interference level equal to or about equal to $P_i$ (block 615). According to an example embodiment, the UE may determine $P_{iBS}$ as follows $$P_{iBS}=P_i+PL_{BS}+M+\Delta,$$

where $PL_{BS}$ is the pathloss for the channel between the UE and the eNB, M is a bandwidth of the channel, and $\Delta$ is an adjustment factor for a modulation and coding scheme (MCS) level, interference margin, and the like, where the values are in dB. It is noted that by definition, $P_{iBS}$ is the highest transmit power level of the UE since if the UE transmits at a higher power level, then $P_i$ would likely be violated.

In addition to measuring or estimating the pathloss, the UE may also receive an indication of a minimum power level, denoted $P_{DMIN}$, which will result in successful detection and decoding of the transmission from the UE. According to an example embodiment, the UE may make use of the measured or estimated pathloss and $P_{DMIN}$ to determine a minimum transmit power level, denoted $P_D$, for a DMC transmission to the DMC UE, which may be expressible as $$P_D = P_{DMIN} + \alpha PL_D + M + \Delta_{TF},$$

where $\alpha$ is a compensation factor for pathloss, $PL_D$ is the pathloss of the DMC channel, M is the bandwidth of the DMC channel, and $\Delta_{TF}$ is a modulation and coding scheme level consideration factor, where the values are in dB.

The UE may set it's transmit power level for transmissions occurring while it is operating in the DMC operating mode according to both $PL_{BS}$ and $PL_D$, while ensuring that requirements $P_i$ and $P_{DMIN}$ are met (block 620). According to an example embodiment, the UE may set it's transmit power level by selecting a smaller of $P_{iBS}$ and $P_D$, expressible as $$P_{DTX} = \min\{P_{iBS}, P_D\},$$

where $P_{DTX}$ is the transmit power level of the UE while operating in the DMC operating mode, and min{a, b} is a function that returns the smaller of arguments a and b.

However, the UE may need to also consider its own transmit power level limitations, which it may not be able to exceed (block 625). Therefore, the UE may set it's transmit power level for transmissions occurring while it is operating in the cellular operating mode as $$P_{BSTX} = \min\{P_{iBS}, P_{MAX}\},$$

where $P_{BSTX}$ is the transmit power level of the UE while operating in the cellular operating mode, and $P_{MAX}$ is the UE's maximum transmit power level. Additionally, the UE may amend it's transmit power level for transmissions occurring while it is operating in the DMC operating mode as $$P'_{DTX} = \min\{P_{DTX}, P_{MAX}\}.$$

Although the above discussion presents example embodiments of power control equations for setting transmit power levels for transmissions made by the UE as it transmits in the cellular operating mode and the DMC operating mode, it noted that the power control equations are illustrative examples. It may be possible to modify the equations by applying weights to one or more of the terms (such as $P_{DTX}$, $P_{MAX}$, $P_{iBS}$, $P_D$, $PL_{BS}$, $PL_D$, $P_{DMIN}$, M, $\Delta$, $\Delta_{TF}$, $\alpha$, and the like), applying a mathematical function to one or more of the terms (such as addition, subtraction, multiplication, division, logarithms, averaging, and the like), and the like, without changing the spirit and the scope of the example embodiments.

Figure 7:
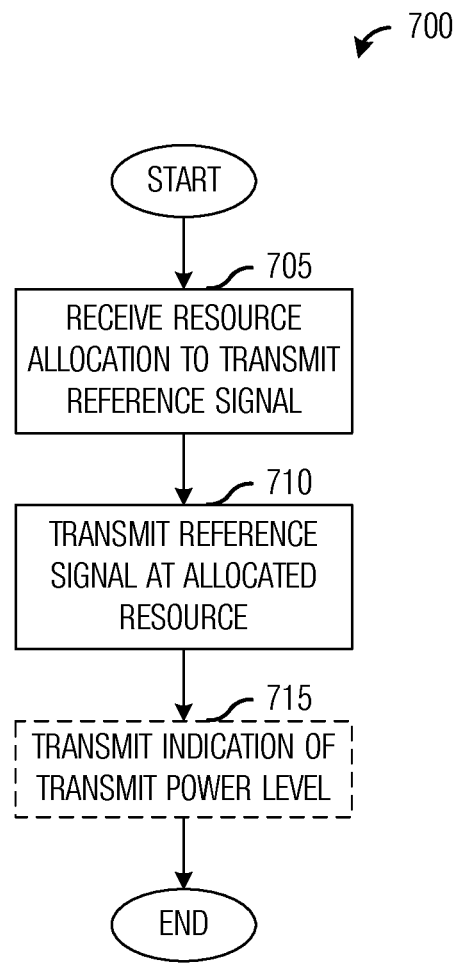
FIG. 7 illustrates an example flow diagram of operations occurring in a UE that is operating in the DMC operating mode according to example embodiments described herein.

FIG. 7 illustrates a flow diagram of operations 700 occurring in a UE that is operating in the DMC operating mode. Operations 700 may be indicative of operations occurring in a UE, such as UE 220 and UE 410, as the UE assists a transmitting UE in performing power control.

Operations 700 may begin with the UE receiving a resource allocation from an eNB that is serving the UE when the UE is operating in the cellular operating mode (block 705). According to an example embodiment, the resource allocation is for network resources to be used by the UE to make a transmission to the transmitting UE to enable the transmitting UE to measure or estimate a pathloss of a channel between the UE and the transmitting UE. The resource allocation may specify when, where, and/or how the UE is to transmit to the transmitting UE. Furthermore, the resource allocation may specify the transmit power level the UE is to use. According to an alternative example embodiment, the UE is preconfigured to use a particular transmit power level whenever making these types of transmissions. According to an alternative example embodiment, the UE is preconfigured to use its maximum transmit power level.

The UE may make the transmission according to the resource allocation (block 710). The UE may transmit a reference signal, a pilot signal, a normal transmission, and the like. The UE may also transmit an indication of the transmit power level of the transmission (block 715). According to an example embodiment, the indication of the transmit power level is included in the transmission made by the UE in block 710. According to another example embodiment, the indication of the transmit power level is transmitted using higher layer messaging. According to another example embodiment, the transmit power level of the UE is specified in the resource allocation received by the UE in block 705, which may also be received by the transmitting UE, so the UE may not need to transmit the indication. Hence, block 715 may be an optional operation.

Figure 8:
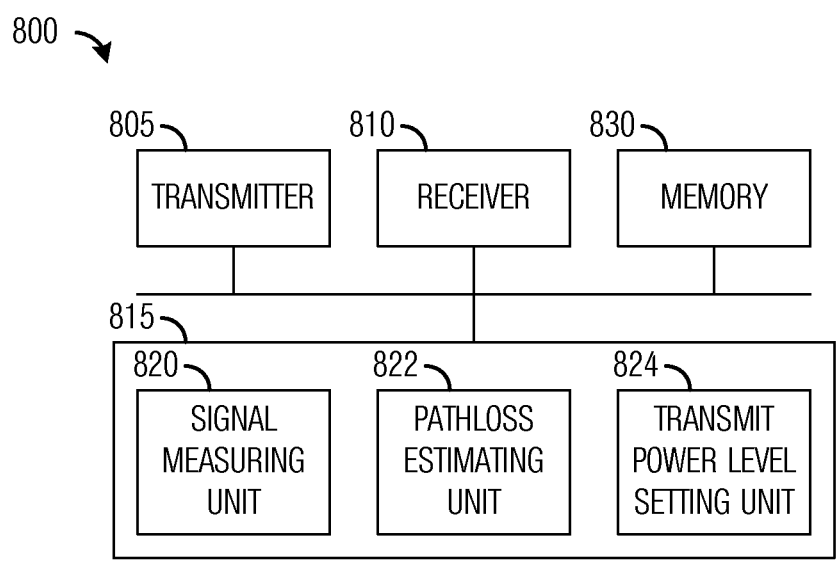
FIG. 8 illustrates an example communications device according to example embodiments described herein.

FIG. 8 illustrates a diagram of a communications device 800. Communications device 800 may be an implementation of a UE of a communications system. Communications device 800 may be used to implement various ones of the embodiments discussed herein. As shown in FIG. 8, a transmitter 805 is configured to send messages, and the like, and a receiver 810 is configured to receive messages, receive signals, transmission requests, and the like. Transmitter 805 and receiver 810 may have a wireless interface, a wireline interface, or a combination thereof.

A signal measuring unit 820 is configured to measure a signal strength of a transmission received by receiver 810. A pathloss estimating unit 822 is configured to estimate a pathloss for a channel from communications device 800 and another communications device, such as an eNB or another UE. Pathloss estimating unit 822 may estimate the pathloss according to a signal strength value provided by signal measuring unit 820 and a reported transmit power level. A transmit power level setting unit 824 is configured to set a transmit power level for communications device 800. As an example, while communications device 800 is operating in a cellular operating mode, transmit power level setting unit 824 may set the transmit power level according to a pathloss of a channel between communications device 800 and the eNB, while communications device 800 is operating in a DMC operating mode, transmit power level setting unit 824 may set the transmit power level according to a pathloss of a channel between communications device 800 and another UE, as well as the pathloss of the channel between communications device 800 and the eNB. A memory 840 is configured to store pathlosses, transmit power level settings, transmit power levels, signal strength measurements, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

Furthermore, in a situation wherein communications device 800 is a recipient in a DMC transmission, receiver 810 is configured to receive a resource allocation, transmitter 805 is configured to make a transmission in network resources specified in the resource allocation, and transmit power level setting unit 824 is configured to set the transmit power level according to a specified (or predetermined) transmit power level.

As an example, transmitter 805 and receiver 810 may be implemented as a specific hardware block, while signal measuring unit 820, pathloss estimating unit 822, and transmit power level setting unit 824 may be software modules executing in a processor 815, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for transmitting to a direct mobile communications (DMC) device by a user equipment operating in both a cellular mode and a DMC mode, the method comprising:
    estimating a first pathloss of a first channel from the user equipment to a base station according to a difference between a known base station transmit power level and a received base station power level;
    estimating a second pathloss of a second channel from the user equipment to the DMC device according to a difference between a known DMC device transmit power level and a received DMC device power level;
    setting a transmit power level for transmission to the DMC device according to the first pathloss and the second pathloss such that the transmit power level results in an interference level with transmission to the base station less than or equal to a maximum interference level and such that the transmit power level is greater than or equal to a minimum power level, wherein the minimum power level is determined by a minimum receiving power of the DMC, the second pathloss, a bandwidth of the second channel and a modulation and coding scheme of the transmission to the DMC device; and
    transmitting a signal to the DMC device at the transmit power level.

2. The method of claim 1, wherein estimating the first pathloss occurs while the user equipment is operating in the cellular mode.

3. The method of claim 1, wherein estimating the first pathloss occurs while the DMC device is not transmitting.

4. The method of claim 1, wherein estimating the second pathloss occurs while the user equipment is operating in the DMC mode.

5. The method of claim 1, wherein setting the transmit power level comprises selecting a minimum one of a transmit power level according to the minimum receive power level of the DMC device, a transmit power level according to the maximum interference level of the base station, and a maximum transmit power level of the user equipment.

6. The method of claim 1, wherein setting the transmit power level comprises setting a transmit power level of an output amplifier.

7. The method of claim 1, further comprising setting the transmit power level according to a maximum transmit power level of the user equipment.

8. The method of claim 1, wherein estimating the first pathloss comprises:
    measuring a first received power of a first transmission from the base station to the user equipment; and
    subtracting the first received power from the known base station transmit power level to estimate the first pathloss.

9. The method of claim 1, wherein estimating the second pathloss comprises:
    measuring a second received power of a second transmission from the DMC device to the user equipment; and
    subtracting the second received power from the known DMC device transmit power level to estimate the second pathloss.

10. A user equipment comprising:
    a processor configured to estimate a first pathloss of a first channel from the user equipment to a base station according to a difference between a known base station transmit power level and a received base station power level, to estimate a second pathloss of a second channel from the user equipment to a direct mobile communications (DMC) device according to a difference between a known DMC device transmit power level and a received DMC device power level, and to set a transmit power level for transmission to the DMC device according to the first pathloss and the second pathloss such that the transmit power level results in an interference level with transmission to the base station less than or equal to a maximum interference level and such that the transmit power level is greater than or equal to a minimum power level, wherein the minimum power level is determined by a minimum receiving power of the DMC, the second pathloss, a bandwidth of the second channel and a modulation and coding scheme of the transmission to the DMC device; and
    a transmitter operatively coupled to the processor, the transmitter configured to transmit a signal to the DMC device at the transmit power level.

11. The user equipment of claim 10, wherein the processor is configured to select a minimum one of a transmit power level according to the minimum receive power level of the DMC device, a transmit power level according to the maximum interference level of the base station, and a maximum transmit power level of the user equipment.

12. The user equipment of claim 10, wherein the processor configured to estimate the first pathloss comprises the processor configured to estimate the first pathloss while the user equipment is operating in a cellular mode.

13. The user equipment of claim 10, wherein the processor configured to estimate the first pathloss comprises the processor configured to estimate the first pathloss while the DMC device is not transmitting.

14. The user equipment of claim 10, wherein the processor configured to estimate the second pathloss comprises the processor configured to estimate the second pathloss while the user equipment is operating in a DMC mode.

15. The user equipment of claim 10, wherein the user equipment further comprises an output amplifier, and wherein the processor configured to set the transmit power level comprises the processor configured to set the transmit power level of the output amplifier.

16. The user equipment of claim 10, wherein the processor configured to set the transmit power level comprises the processor configured to set the transmit power level according to a maximum transmit power level of the user equipment.

17. The user equipment of claim 10, wherein the processor configured to estimate the first pathloss comprises the processor configured to:
    measure a first received power of a first transmission from the base station to the user equipment; and
    subtract the first received power from the known base station transmit power level to estimate the first pathloss.

18. The user equipment of claim 10, wherein the processor configured to estimate the second pathloss comprises the processor configured to:
measure a second received power of a second transmission from the DMC device to the user equipment; and
subtract the second received power from the known DMC device transmit power level to estimate the second pathloss.

* * * * *